United States Patent [19]
Eom et al.

[11] Patent Number: 6,034,453
[45] Date of Patent: Mar. 7, 2000

[54] MOTOR HAVING FLUID BEARING WITH A CLEARANCE CONTROL UNIT

[75] Inventors: Jae-yong Eom, Kyonggi-do; Seung-gon Kim, Seoul, both of Rep. of Korea

[73] Assignee: Samsung Electronics Co., Ltd., Kyungki-do, Rep. of Korea

[21] Appl. No.: 09/022,386

[22] Filed: Feb. 12, 1998

[30]     Foreign Application Priority Data

Feb. 14, 1997 [KR]   Rep. of Korea .......................... 97-4508

[51] Int. Cl.⁷ ................................. H02K 5/16; H02K 7/08
[52] U.S. Cl. ........................ 310/90; 310/62 R; 310/68 R; 310/91
[58] Field of Search ................................ 310/67 R, 68 R, 310/90 R, 90 JR; 384/110, 247, 249, 264

[56]         References Cited

U.S. PATENT DOCUMENTS

| | | | |
|---|---|---|---|
| 4,415,308 | 11/1983 | Maruyama et al. | 415/72 |
| 4,470,752 | 9/1984 | Teruo et al. | 415/72 |
| 4,919,547 | 4/1990 | Schwartzman | 384/110 |
| 5,254,893 | 10/1993 | Ide | 310/90 |
| 5,283,491 | 2/1994 | Jabbar et al. | 310/90 |
| 5,284,391 | 2/1994 | Diel et al. | 384/108 |
| 5,453,650 | 9/1995 | Hashimoto et al. | 310/268 |
| 5,619,083 | 4/1997 | Dunfield et al. | 310/90.5 |
| 5,623,382 | 4/1997 | Moritan et al. | 360/99.08 |
| 5,689,146 | 11/1997 | Cheever | 310/90 |
| 5,751,080 | 5/1998 | Hong | 310/67 R |
| 5,772,334 | 6/1998 | Parkins et al. | 384/117 |

*Primary Examiner*—Elvin Enad
*Attorney, Agent, or Firm*—Sughrue, Mion, Zinn Macpeak & Seas, PLLC

[57]          ABSTRACT

A motor having a fluid bearing in which a clearance control unit is provided in a housing so as to stably rotate a rotor shaft of a rotor by controlling a clearance between the rotor shaft and a shaft groove. The clearance control unit includes a clearance control rod inserted into a through hole which passes through the shaft groove from an external side of the housing, and a feed gear for feeding the clearance control rod. One end of the feed gear is rotatably mounted into one end of a groove formed to be connected with the through hole, and the other end of the feed gear is formed to fit a feed screw exposed to the external side of the housing into a screw hole. The feed gear moves the clearance control rod closer to the rotor shaft, causing an increased air pressure between the clearance control rod and the rotor shaft for moving the rotor shaft into center alignment in the shaft groove.

7 Claims, 5 Drawing Sheets

MOTOR HAVING FLUID BEARING WITH A CLEARANCE CONTROL UNIT

BACKGROUND OF THE INVENTION

1. Field of the Invention

The present invention relates to a motor having a fluid bearing, and more particularly, to a motor having a bearing groove in a rotary shaft of a rotor (rotary body), in which a clearance control unit is formed at an external side of a housing and a shaft groove for inserting the rotor shaft to uniform an air pressure between the bearing groove on an external side of the rotor shaft and an internal side of the shaft groove.

2. Description of the Related Art

Generally, in an apparatus having a motor and a rotor in which a fluid bearing is mounted, a predetermined clearance is formed between a rotor shaft and an internal side of a shaft groove wherein the rotor shaft is inserted, when the rotor shaft rotates. The clearance occurs due to an air pressure formed in a plurality of bearing grooves on an external side of the rotor shaft when the rotor shaft rotates.

Furthermore, a predetermined clearance of several um is maintained between the internal side of the shaft groove and the external side of the rotor shaft. The air pressure occurring therebetween is susceptible to a fine change in the internal side of the shaft groove as well as the external side of the rotor shaft.

Thus, when the rotor shaft having a conventional fluid bearing rotates, the internal side of the shaft groove or the external side of the bearing groove may become rough or uneven due to unexpected external forces and the like. In this case, the position of the rotor shaft is varied with respect to the internal side of the shaft groove. As a result, oscillation of the rotor shaft occurs when the rotor shaft rotates.

Such oscillation of the rotor shaft causes malfunction of the motor and the apparatus having a rotary body such as the rotor shaft. For example, in the case of a scanning motor, if oscillation of the rotary shaft occurs, a polygon mirror oscillates, too. The polygon mirror is a polygonal plate body having a predetermined thickness and is generally made of aluminum material. The polygon mirror is mounted into a sleeve of a rotor in the scanning motor which is mounted into a scanner or a laser printer. If the rotor rotates, the polygon mirror rotates at the same time and reflects laser beams emitted from a predetermined position to deflect the laser beams into a printing drum. If oscillation of the polygon mirror occurs, the laser beams are not reflected upon the polygon mirror at an exact angle. This significantly reduces reliability of the product such as the scanner or the laser printer.

SUMMARY OF THE INVENTION

Accordingly, the present invention is directed to a motor having a fluid bearing that substantially obviates one or more of the problems due to limitations and disadvantages of the related art.

An object of the present invention is to provide a motor having a fluid bearing in which a clearance control unit is provided in a housing so as to stably rotate a rotor shaft of a rotor by controlling a clearance between the rotor shaft and a shaft groove.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a motor having a fluid bearing according to the present invention includes a stator formed in a housing, a rotor facing the stator at a predetermined interval, a rotor shaft having a plurality of bearing grooves, for rotatably supporting the rotor, a shaft groove formed in the housing to insert the rotor shaft thereinto, and a clearance control unit formed in the housing to pass through the shaft groove, for controlling a clearance between the shaft groove and the rotor shaft.

In the preferred embodiment of the present invention, the clearance control unit includes a clearance control rod inserted into a through hole which passes through the shaft groove from an external side of the housing, and a feed gear for feeding the clearance control rod. A front end portion of the clearance control rod has a curvature shape suitable for the external side of the rotor shaft. An air pressure generating groove having a predetermined depth is formed at a portion which faces the front end portion of the clearance control unit of the rotor shaft so that the front end portion of the clearance control rod is inserted thereinto along a circumferential direction on the external side of the rotor shaft. Furthermore, a projection portion having a screw hole in which a screw is provided is formed at a predetermined portion of the clearance control unit. One end of the feed gear is rotatably mounted into one end of a groove formed to be connected with the through hole. The other end of the feed gear is formed to fit a feed screw exposed to the external side of the housing into the screw hole of the projection portion. At one end of the feed screw, a screw groove or a knob is formed to rotate the feed screw.

In the other preferred embodiment of the present invention, the clearance control unit includes a clearance control rod fitted into a through hole having a screw, which passes through the shaft groove from the external side of the housing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
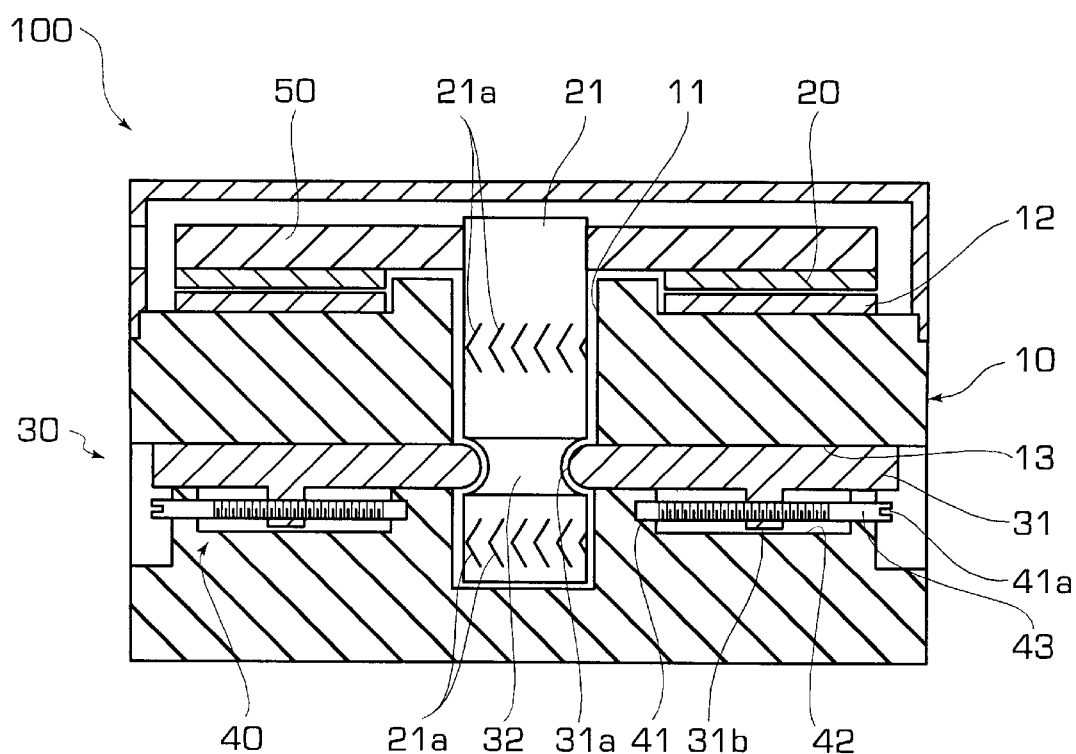
FIG. 1 is a sectional view illustrating a scanning motor according to one embodiment of the present invention.
Figure 2:
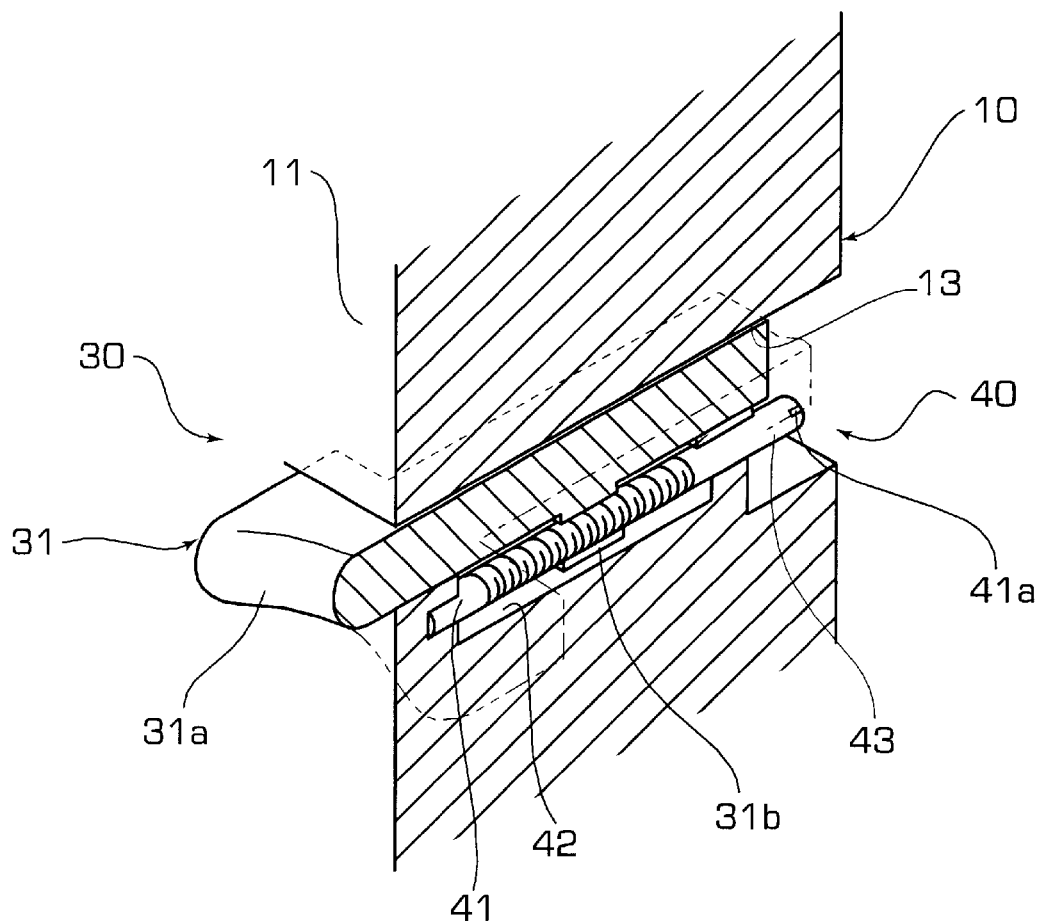
FIG. 2 is an enlarged perspective view illustrating a main portion of FIG. 1.

FIG. 1 is a sectional view illustrating a scanning motor according to one embodiment of the present invention. FIG. 2 is an enlarged perspective view illustrating a main portion of FIG. 1.

A motor 100 includes a stator 12 formed in a housing 10, a rotor 20 which faces the stator 12 at a predetermined interval, a rotor shaft 21 for rotatably supporting the rotor 20, a shaft groove 11 formed in the housing 10 to insert the rotor shaft 21 thereinto, and a plurality of bearing grooves 21a formed in the rotor shaft 21 or the shaft groove 11. Here, the rotor 20 is a rotary body of a polygon mirror.

In the present invention, the motor 100 includes a clearance control unit formed to pass through the shaft groove 11 in the housing 10.

The clearance control unit 30 according to the present invention includes a clearance control rod 31 inserted into a through hole 13 which passes through the shaft groove 11 from an external side of the housing 10, and a feed gear 40 for feeding the clearance control rod 31.

Referring to FIG. 2, in the housing 10, a plurality of through holes 13 are formed in a radial manner to pass through the shaft groove 11 from the external side of the housing 10 to the center. The clearance control rod 31 is inserted into the through hole 13. A fluid (not shown) is formed between the through hole 13 and the clearance control rod 31 in such a manner that it is not leaked out.

In the embodiment of the present invention, the clearance control rod 31 has a flat rod shape.

Preferably, at the front end portion of the clearance control rod 31, an air pressure generating stage 31a is formed with an arc of a curvature to be corresponded to the external side of the rotor shaft 21. In addition, an air pressure generating groove 32 having a predetermined depth is formed on the rotor shaft 21 at a portion which faces the through hole 13 so that the front end portion of the clearance control rod 31 is inserted thereinto along a circumferential direction on the external side of the rotor shaft 21. At this time, it is desirable that the air pressure generating stage 31a and the air pressure generating groove 32 have shapes which correspond to each other. For example, if the air pressure generating stage 31a has a hemispheric shaped section in a longitudinal direction, the air pressure generating groove 32 has a hemispheric shaped section in a longitudinal direction, too.

Furthermore, a groove 42 is formed below the through hole 13 to be connected to the through hole 13 and a feed screw 40 is mounted therein. One end 41 of the feed screw 40 is rotatably mounted into a supporting groove (not shown) formed at one side in the groove 42. The other end 43 of the feed screw 40 passes through a through groove (not shown) to be exposed to an outside of the housing 10. A projection portion 31b is integrally formed at an intermediate portion of the clearance control rod 31. In the projection portion 31b, a screw is formed to be fitted into the feed screw 40. Thus, a rotative motion of the feed screw 40 can be converted into a rectilinear motion of the clearance control rod 31.

Although the groove 42 is formed below the through hole 13 in the embodiment of the present invention, the groove may be formed over the through hole 13. The groove may also be formed at the left or right side of the through hole 13.

Preferably, a screw groove 41a, capable of rotating the feed screw 40, is formed at the end 43 of the feed screw 40 exposed to the outside of the housing. It is preferable that the screw groove 41a is formed to be matched with a predetermined tool, for example, a driver.

The operation of the aforementioned motor according to the present invention will be described below.

If an external electrical signal is applied to the stator 12, the rotor 20 rotates around the rotor shaft 21 by electromagnetic action between the rotor 20 and the stator 12. At this time, air between the shaft groove 11 and the rotor shaft 21 flows into the respective bearing groove 21a, and the air radiates to the outside from the rotor shaft 21. The radiated air thrusts the internal side of the shaft groove 11 and a side of the bearing groove 21a at a predetermined pressure. As a result, the rotor shaft 21 rotates without contacting the internal side of the shaft groove 11.

As aforementioned, if the rotor shaft 21 rotates, it is determined whether the rotor shaft 21 rotates in the center of the shaft groove 11 by measuring the position of the rotor shaft 21 or the center of the rotor shaft 21. In other words, how the position of the shaft varies when the shaft rotates is measured. After marking the center of the shaft by a predetermined mark, how the mark is out of the center of the shaft is measured.

If it is determined that the rotor shaft 21 rotates without deviating from the center of the shaft groove 11, it is not necessary to control a clearance. On the other hand, if a significant error occurs, it is necessary to correct the rotation position of the rotor shaft 21 using the clearance control unit 30. In this case, the operation of the clearance control unit 30 is as follows.

Figure 3:
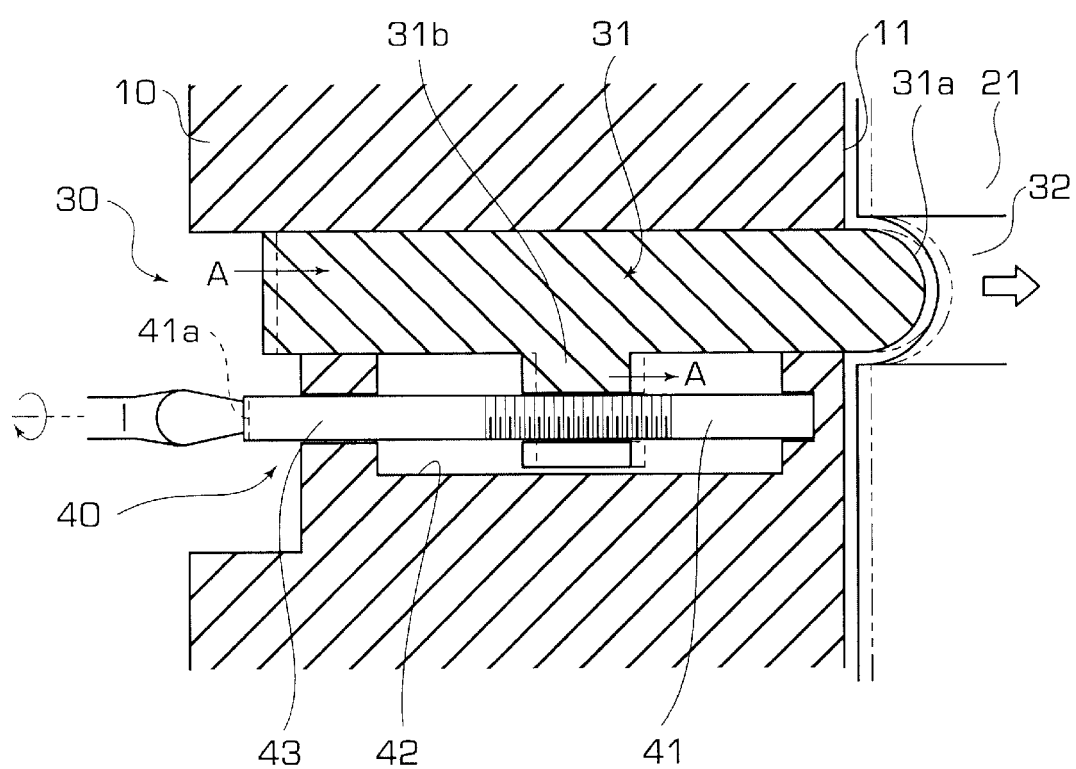
FIG. 3 is a sectional view illustrating an operating state of a clearance control unit according to the present invention.

As illustrated in FIG. 3, if the rotor shaft 21 is out of center alignment, thus causing a significant error during rotation, the clearance control unit 31 is thrust in an arrow direction A to move the rotor shaft 21 to a predetermined position marked by an alternate long and short dash line.

In further detail, if a significant error is sensed during rotation, the screw groove 41a formed at the exposed end portion 43 of the feed screw 40 is rotated by a driver for a predetermined amount. If the screw groove 41a rotates, the projection portion 31b fitted into the feed screw 40 moves in the arrow direction A.

As a result, the clearance control rod 31 formed integrally with the projection portion 31b moves in an amount determined by the rotation of the feed screw 40, so as to thrust the rotor shaft 21. The rotor shaft 21 moves as a predetermined pressure occurs due to the fluid bearing action between the air pressure generating stage 31a of the clearance control rod 31 and the air pressure generating groove 32 of the rotor shaft 21. Thus, the rotor shaft 21 moves to a predetermined position without the air pressure generating stage 31a contacting the air pressure generating groove 32.

When the clearance control rod 31 is moved towards the rotor shaft 21, the clearance between the air pressure generating stage 31a and the air pressure generating groove 32 gets narrower. If the pressure in the narrowed clearance gets higher, the rotor shaft 21 is thrust to a clearance having a pressure lower than the narrowed clearance.

The clearance control unit 30 may be mounted in one position. For more exact control, the clearance control unit may be mounted in two or three positions.

Figure 4:
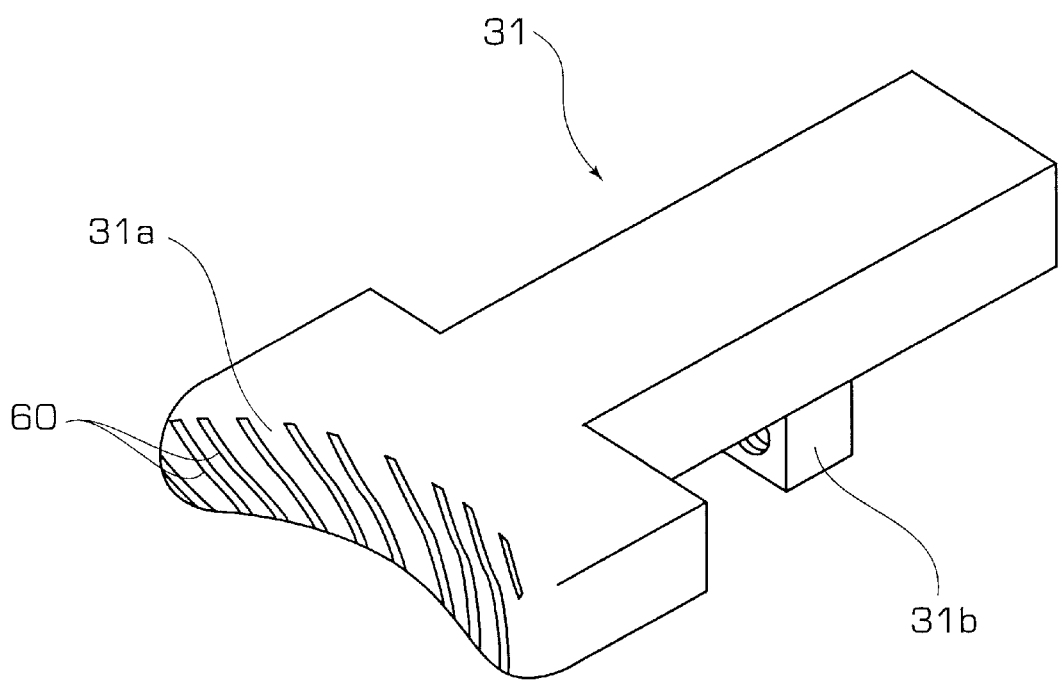
FIG. 4 is a perspective view illustrating a bearing groove formed in a clearance control rod according to another embodiment of the present invention.

FIG. 4 shows another embodiment of the present invention. Referring to FIG. 4, since a bearing groove 60 is formed at the air pressure generating stage 31a, a higher pressure can occur between the air pressure generating stage 31a and the air pressure generating groove 32.

Figure 5:
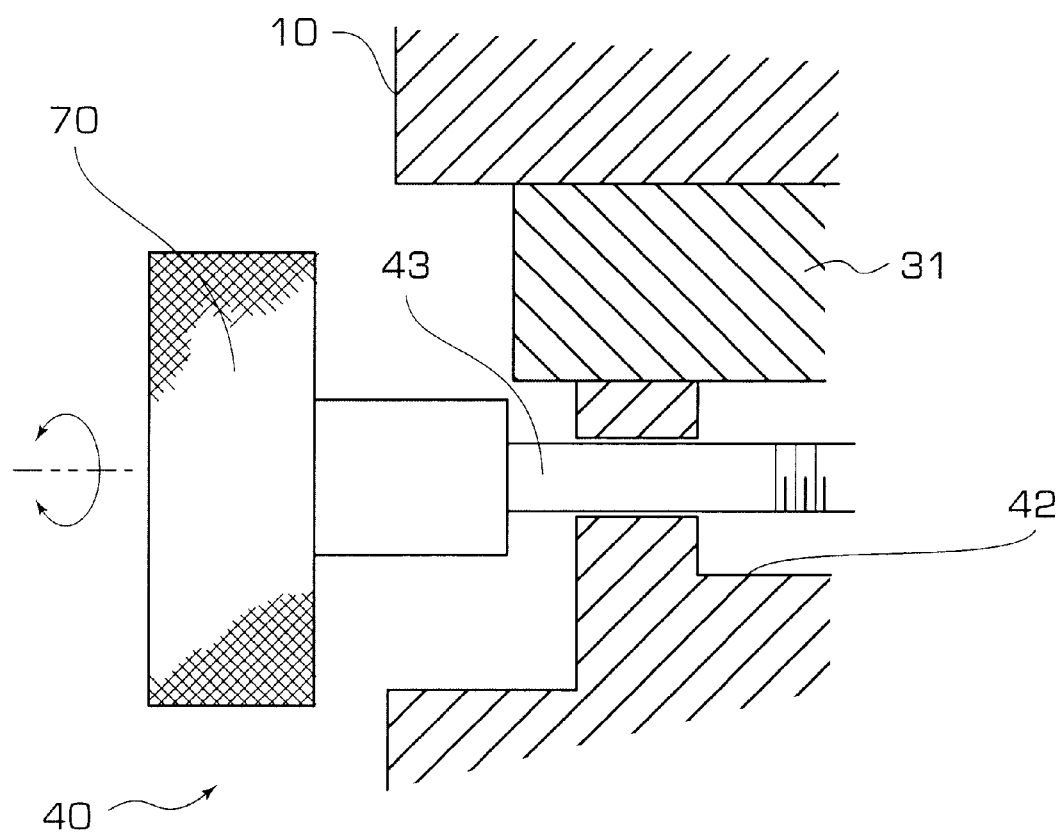
FIG. 5 is a sectional view illustrating a knob formed at one end of a feed screw.

Referring to FIG. 5, a knob 70, instead of the screw groove 41a, is formed at the exposed end portion 43 of the feed screw 40. Thus, the feed screw 40 can be rotated without a tool, such as a driver. Preferably, the knob 70 has a diameter larger than that of the feed screw 40.

As aforementioned, the motor according to the present invention has the following advantages.

Since the clearance control unit is mounted into various motors having the bearing groove in the rotary shaft of the rotor or other product, it is possible to control a rotative error of the rotor shaft. Thus, uniform and stable rotation of the rotor shaft can be achieved, thereby improving reliability of the product.

It will be apparent to those skilled in the art that various modifications and variations can be made in the motor having the fluid bearing according to the present invention without departing from the spirit or scope of the invention. For example, the shape of the clearance control rod can be freely designed. In addition, the clearance control rod may be fitted into the through hole having the screw, without forming the projection portion, so that the screw groove may be formed at the end portion. Thus, it is intended that the present invention cover the modifications and variations of the invention provided they come within the scope of the appended claims and their equivalents.

What is claimed is:

1. A motor having a fluid bearing, comprising:
    a stator formed in a housing;
    a rotor which faces said stator at a predetermined interval;
    a rotor shaft having a plurality of bearing grooves thereon, for rotatably supporting said rotor;
    a shaft groove formed in said housing to insert said rotor shaft thereinto; and
    a clearance control unit formed in said housing and protruding from said housing into said shaft groove so as to be perpendicular to axial length of said rotor shaft, for controlling a clearance between said shaft groove and said rotor shaft,
    wherein said clearance control unit includes a clearance control rod inserted into a through hole, said through hole passing through said housing from an external side of said housing to an internal side of said housing so as to be perpendicular to said shaft groove, and a feed gear for feeding said clearance control rod along said through hole.

2. The motor having a fluid bearing as claimed in claim 1, wherein a front end portion of said clearance control rod has a curvature shape which corresponds to a external side of said rotor shaft.

3. The motor having a fluid bearing as claimed in claim 2, wherein an air pressure generating groove having a predetermined depth is formed on the external side of said rotor shaft at a portion which faces said front end portion of said clearance control unit of said rotor shaft so that said front end portion of said clearance control rod is inserted thereinto along a circumferential direction on the external side of said rotor shaft.

4. The motor having a fluid bearing as claimed in claim 3, wherein said clearance control unit has a projection portion having a screw hole in which a screw is provided at a predetermined position.

5. The motor having a fluid bearing as claimed in claim 4, wherein a first end of said feed gear is rotatably mounted into one end of a groove formed to be connected with the through hole, and a second end of said feed gear is formed to fit a feed screw exposed to the external side of said housing into the screw hole of said projection portion.

6. The motor having a fluid bearing as claimed in claim 5, wherein a means for rotating said feed screw is formed at the second end of said feed gear.

7. The motor having a fluid bearing as claimed in claim 6, wherein said rotating means is a screw groove.

\* \* \* \* \*